United States Patent [19]

Ueno

[11] Patent Number: 5,787,202

[45] Date of Patent: Jul. 28, 1998

[54] CHARACTER RECOGNITION APPARATUS

[75] Inventor: Shugoro Ueno, Tokyo, Japan

[73] Assignee: Canon Kabushiki Kaisha, Tokyo, Japan

[21] Appl. No.: 191,158

[22] Filed: Feb. 3, 1994

Related U.S. Application Data

[63] Continuation of Ser. No. 844,862, Mar. 2, 1992, abandoned, which is a continuation of Ser. No. 544,949, Jun. 28, 1990, abandoned.

[30] Foreign Application Priority Data

Jun. 29, 1989 [JP] Japan ..................... 1-165289

[51] Int. Cl.$^6$ .......................................... G06K 9/70
[52] U.S. Cl. ............................... 382/227; 382/228
[58] Field of Search ........................... 382/10, 30, 34, 382/36, 37, 38, 39, 177, 159, 224, 226–228, 181

[56] References Cited

U.S. PATENT DOCUMENTS

| | | |
|---|---|---|
| 3,634,822 | 1/1972 | Chow ......................... 382/39 |
| 4,315,246 | 2/1982 | Milford ...................... 382/140 |
| 4,521,909 | 6/1985 | Wang ......................... 382/38 |
| 4,566,124 | 1/1986 | Yamamoto et al. .......... 382/60 |
| 4,573,196 | 2/1986 | Crane et al. ................ 382/30 |
| 4,589,142 | 5/1986 | Bednar ....................... 382/38 |
| 4,610,025 | 9/1986 | Blum et al. ................. 382/30 |
| 4,654,873 | 3/1987 | Fujisawa et al. ............ 382/30 |
| 4,718,102 | 1/1988 | Crane et al. ................ 382/30 |
| 4,958,379 | 9/1990 | Yamaguchi et al. ......... 382/39 |
| 4,998,285 | 3/1991 | Suzuki et al. ............... 382/9 |
| 5,033,101 | 7/1991 | Sood .......................... 382/30 |
| 5,040,226 | 8/1991 | Elischer et al. ............. 382/138 |
| 5,050,224 | 9/1991 | Mori .......................... 382/34 |
| 5,191,622 | 3/1993 | Shojima et al. ............. 382/30 |

*Primary Examiner*—Christopher S. Kelley
*Attorney, Agent, or Firm*—Fitzpatrick, Cella, Harper & Scinto

[57] ABSTRACT

This invention provides a character recognition apparatus comprising: dictionary storage means for storing a plurality of dictionaries; deriving means for deriving a candidate character and an operation result from a character image data by using a first dictionary stored in said storage means; judging means for judging whether or not if the operation result derived by said deriving means satisfies a predetermined reference value; and controlling means for controlling to recognize said character again by using a second dictionary different from said first dictionary used for deriving said operation result, if said judging means judges that said operation result does not satisfy said reference value.

55 Claims, 4 Drawing Sheets

CHARACTER RECOGNITION APPARATUS

This application is a continuation-in-part continuation of application Ser. No. 07/844,862, filed Mar. 2, 1992, now abandoned, which is a continuation-in-part continuation of application Ser. No. 07/544,949 filed Jun. 28, 1990, now abandoned.

BACKGROUND OF THE INVENTION

1. Field of the Invention

The present invention relates to a character recognition apparatus providing a plurality of character recognizing methods.

2. Related Background Art

With the apparatus of this type, a character is cut out from image data and is recognized by using a recognizing method which follows a predetermined algorithm, the recognition results in an output of a candidate character.

Since a character has been recognized conventionally by using a recognizing method which follows a predetermined algorithm, the recognition factor can not be improved and it takes a long time in recognizing a character.

SUMMARY OF THE INVENTION

The present invention eliminates the above-described prior art disadvantages, and provides a character recognition apparatus capable of improving a recognition factor and saving a recognition time.

The present invention provides a character recognition apparatus comprising:

dictionary storage means for storing a plurality of dictionaries;

deriving means for deriving a candidate character and an operation result from a character image data by using a first dictionary stored in said storage means;

judging means for judging whether or not the operation result derived by said deriving means satisfies a predetermined reference value; and controlling means for controlling to recognize said character again by using a second dictionary different from said first dictionary used for deriving said operation result, if said judging means judges that said operation result does not satisfy said reference value.

DESCRIPTION OF THE PREFERRED EMBODIMENTS

[1st Embodiment]

Preferred embodiments of this invention will be described in detail with reference to the accompanying drawings.

Figure 1:
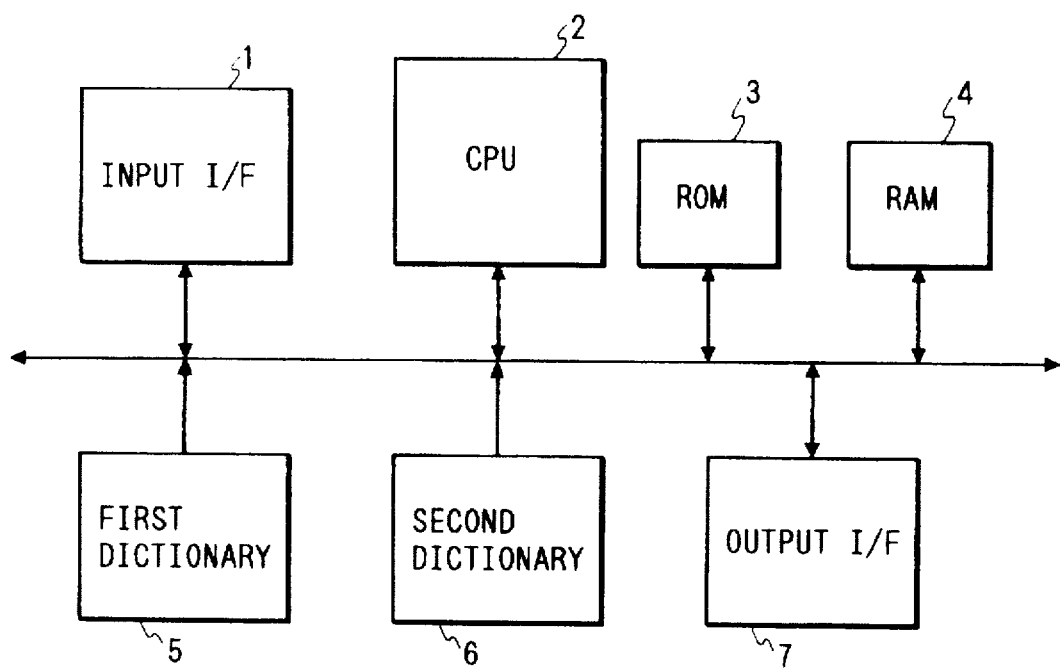
FIG. 1 is a block diagram showing the structure of a character recognition apparatus according to the embodiment of this invention.

FIG. 1 is a block diagram showing the structure of the character recognition apparatus according to the embodiment. In FIG. 1, an input interface (I/F) 1 receives a character image data from an input device such as an image scanner or tablet. A CPU 2 controls the apparatus in accordance with various programs stored in a ROM 3. ROM 3 stores therein control programs, error processing programs, programs shown as the flow chart in FIG. 2, and other data. As will be described later, ROM 3 stores a reference value which is used for checking the recognition result or operation result of one character by using a first dictionary 5 or second dictionary 6.

A RAM 4 is used as a working area for various programs described above, and a temporary saving area during an error processing. RAM 4 stores a character image data inputted from the input I/F 1.

The first dictionary 5 is formed by using a first character recognition algorithm, and the second dictionary 6 by using a second character recognition algorithm. The first and second dictionaries 5 and 6 are selectively used upon an instruction from CPU 2. The dictionary may be formed in a detachable storage medium such as an IC memory card, and a user selects a desired card and loads it in the character recognition apparatus.

An output I/F 7 outputs a recognition result to an external host computer.

The operation of this embodiment will be described next.

Figure 2:
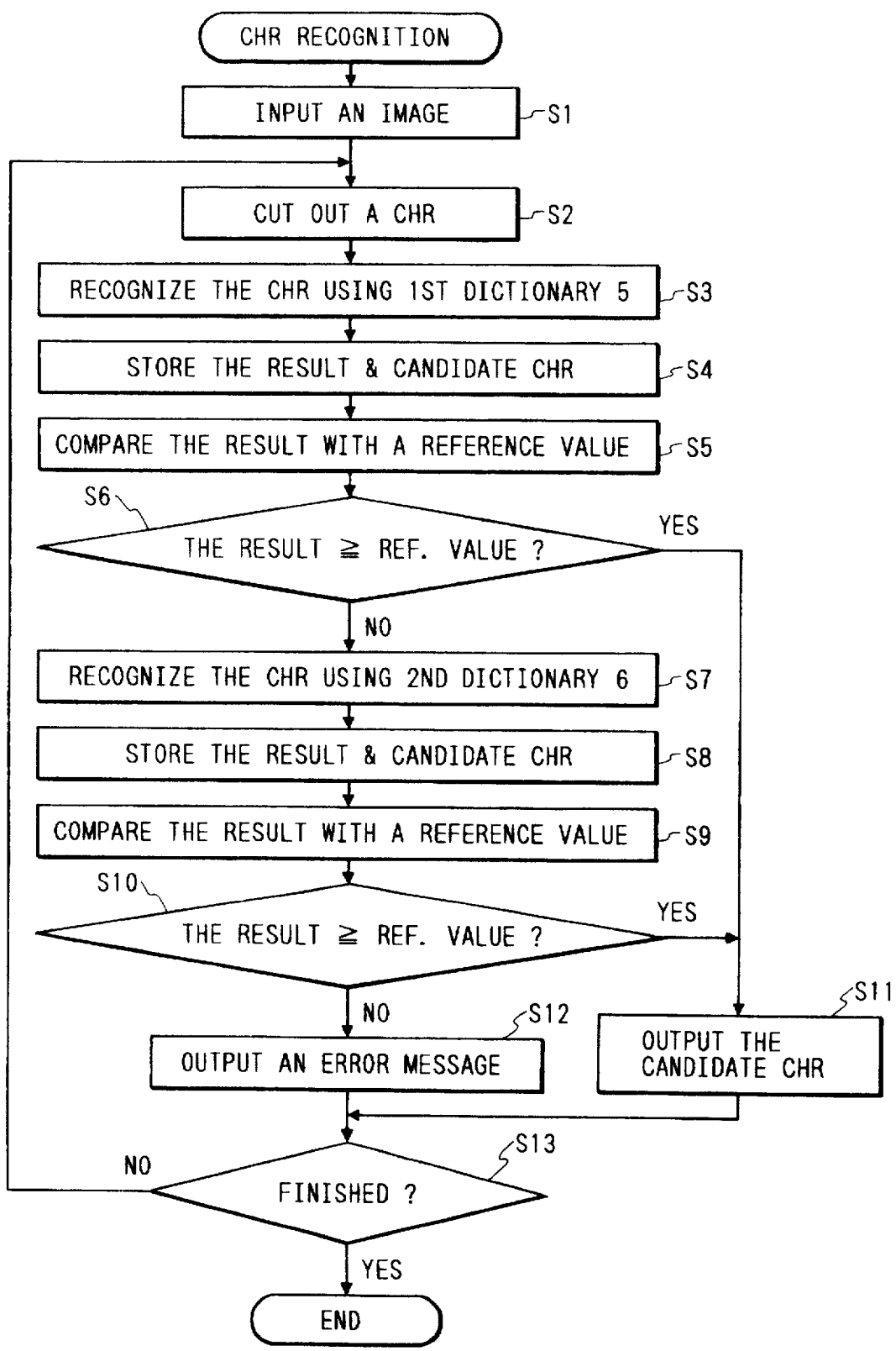
FIG. 2 is a flow chart explaining the operation of a character recognition process according to a first embodiment.

FIG. 2 is a flow chart used for explaining the operation of the character recognition processing according to the embodiment.

An original document is read with an image scanner (not shown), and a character image data is inputted and stored in RAM 4 at an image storage area (step S1). A single character is cut out (step S2). The recognition operation is executed by using the first dictionary 5 (step S3). The difference between the first and second dictionaries 5 and 6 is, for example, that the former has characters used frequently and the latter has characters used less frequently. Alternatively, the first dictionary may be formed by using a simple and fast algorithm, and the second dictionary by using an algorighm which is complex and recognizes a character precisely. The operation result (value) and a candidate character obtained by character recognition are temporarily stored in RAM 4. The operation result is compared with the reference value stored in ROM 3 (step S5). If the operation result satisfies the reference value, the candidate character stored in RAM 4 is outputted via the output I/F to a host computer (not shown) (step S11). The operations starting from step 2 to step S11 are repeated until all characters have been recognized.

If it is judged at step S6 that the operation result does not satisfy the reference value, the character recognition using the second dictionary is executed (step S7). The operation result (value) and a candidate character obtained through character recognition at step S7 are stored in RAM 4, and the operation result and the reference value are compared with each other in the similar manner at step S5 (step S9). If the operation result does not satisfy the reference value (step S10), an error message notifying inability of recognition is sent to the host computer (step S12). The processes starting from step S2 are repeated until all characters have been recognized. If the operation result satisfies the reference value (step S10), the candidate character stored in RAM 4 is outputted to the host computer via the output I/F (step S11). The processes starting from step S2 are repeated until all characters have been recognized.

In the flow chart shown in FIG. 2, if character recognition is not possible, an error message is sent to the host computer. Instead, a plurality of candidate characters may be sent to the host computer.

In the above embodiment, the output of the apparatus is sent to the host computer. This invention is not limited thereto, but the output may be sent to a display device such as a CRT display or a recording apparatus such as a printer. For the case of a display device, a plurality of candidate characters can be displayed as the results of recognition, and a keyboard may be used to select one of candidate characters.

Further, in the above embodiment, the first and second dictionaries are used. The invention is not limited thereto, but three or more dictionaries may be used within the scope of this invention.

[2nd Embodiment]

The second embodiment of this invention will be described in detail with reference to the flow chart shown in FIG. 3.

The character recognition apparatus of this embodiment has the same structure as shown in the block diagram of FIG. 1 of the first embodiment, and the detailed description for FIG. 1 has been given above, so it is omitted herein.

The operation of this embodiment will be described.

Figure 3:
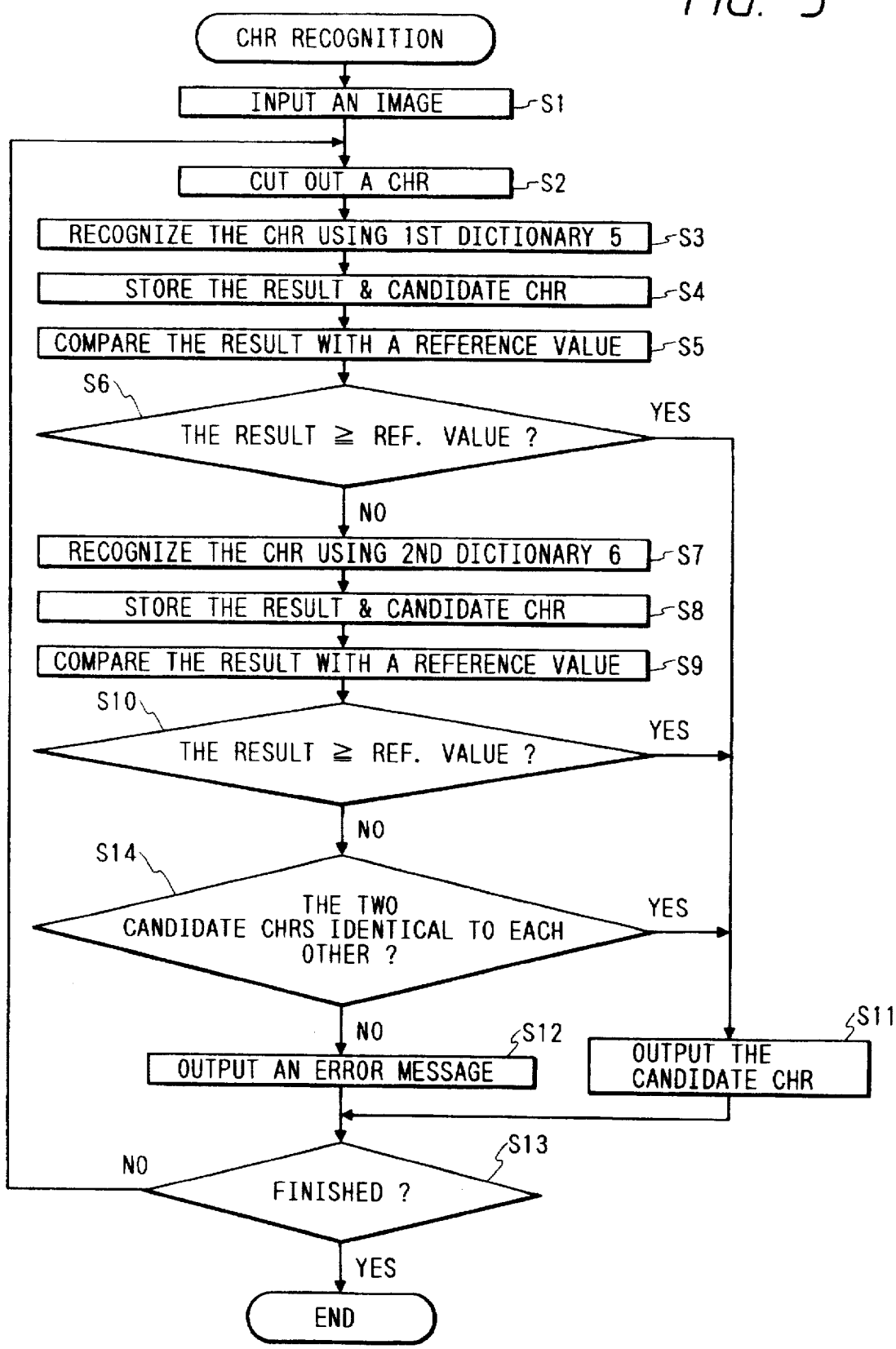
FIG. 3 is a flow chart explaining the operation of a character recognition process according to a second embodiment.

FIG. 3 is a flow chart used for explaining the operation of the character recognition processing of this embodiment.

In FIG. 3 steps S1 to S10 are the same as steps S1 to S10 of FIG. 1, and the detailed description thereof has been given previously, so it is omitted herein.

The description will be directed to the processing, which is a characteristic feature of this embodiment, and is executed when the operation results at the first and second character recognition do not become larger than the reference value.

If the operation result does not satisfy the reference value at the second character recognition (step S10), CPU 2 judges if the candidate characters at the first and second recognition stored in RAM 4 are the same (step S14). If it is judged that they are the same (step S14), the candidate character is outputted to the host computer via the output I/F 7 (step S11). If it is judged at step S14 that the candidate characters at the first and second recognition are not the same, an error message notifying an inability of recognition is outputted to the host computer via the output I/F 7 (step S12).

If a candidate character is outputted (step S11) or an error message is outputted (step S12), CPU 2 judges if the character is the last one to be recognized or not (step S13). The processes starting from step S2 are repeated until all characters have been recognized.

In the flow chart shown in FIG. 3, if character recognition is not possible, an error message is sent to the host computer. Instead, a plurality of candidate characters may be sent to the host computer.

In the above embodiment, the output of the apparatus is sent to the host computer. This invention is not limited thereto, but the output may be sent to a display device such as a CRT display or a recording apparatus such as a printer. For the case of a display device, a plurality of candidate characters can be displayed as the recognition result, and a keyboard may be used to select one of candidate characters.

Further, in the above embodiment, the first and second dictionaries are used. The invention is not limited thereto, but three or more dictionaries may be used within the scope of this invention.

[3rd Embodiment]

The third embodiment of this invention will be described in detail with reference to the flow chart shown in FIG. 4.

The character recognition apparatus of this embodiment has the same structure as shown in the block diagram of FIG. 1 of the first embodiment, the detailed description for FIG. 1 has been given above, so it is omitted herein.

The operation of this embodiment will be described.

Figure 4:
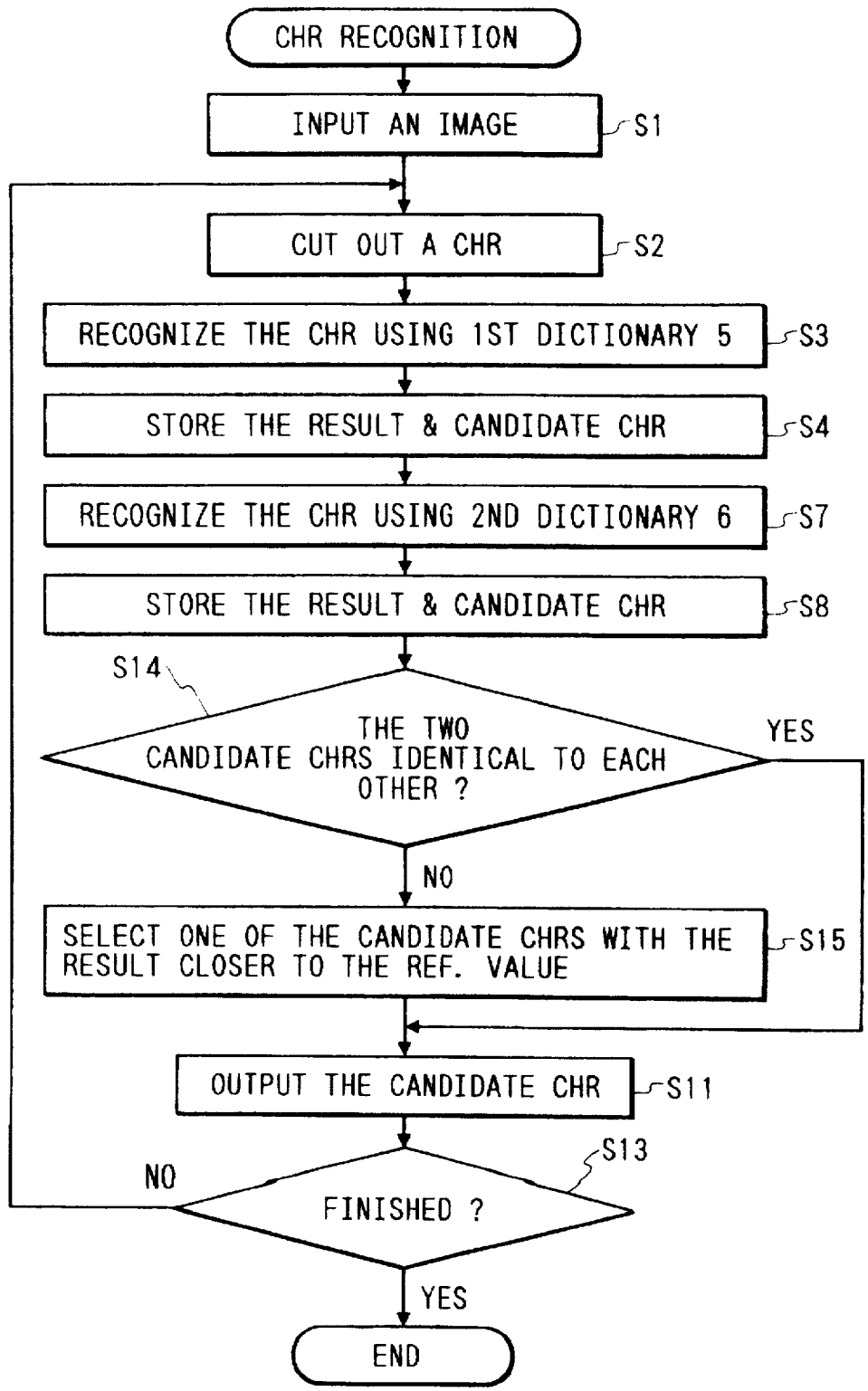
FIG. 4 is a flow chart explaining the operation of a character recognition process according to a third embodiment.

FIG. 4 is a flow chart used for explaining the operation of the character recognition processing of this embodiment.

In FIG. 4, steps S1 to S4 and steps S7 and S8 are the same as corresponding steps of FIG. 1, and the detailed description thereof has been given previously, so it is omitted herein.

In this embodiment, CPU 2 judges if the candidate characters at steps S4 and S8 at the first and second recognition stored in RAM 4 are the same (step S14). If it is judged that they are the same, the candidate character is outputted to the host computer via the output I/F 7 (step S11). If it is judged at step S14 that the candidate characters are not the same, the first and second recognition operation results at steps S4 and S8 stored in RAM 4 are compared with the reference value, and the candidate character having the operation result nearer to the reference value is selected (step S15) and outputted as a candidate (step S11).

The operation result of recognition or the result of comparison with the reference value may be stored in RAM 4. If a candidate character is outputted (step S11), CPU 2 judges if the character is the last one to be recognized or not (step S13). The processes starting from step S2 to step S10 are repeated until all characters have been recognized.

In the flow chart shown in FIG. 4, if character recognition is not possible, an error message is sent to the host computer. Instead, a plurality of candidate characters may be sent to the host computer.

In the above embodiment, the output of the apparatus is sent to the host computer. This invention is not limited thereto, but the output may be sent to a display device such as a CRT display or a recording apparatus such as a printer. For the case of a display device, a plurality of candidate characters can be displayed as the recognition result, and a keyboard may be used to select one of candidate characters.

Further, in the above embodiment, the first and second dictionaries are used. The invention is not limited thereto, but three or more dictionaries may be used within the scope of this invention.

what is claimed is:

1. A character recognition apparatus comprising:

at least first and second dictionary means each for storing a plurality of character patterns, the first dictionary means being different from the second dictionary means in that said first dictionary means stores character patterns used frequently and said second dictionary means stores character patterns used less frequently;

deriving means for deriving a plurality of candidate characters recognized with said first and second dictionary means;

comparison means for comparing the plurality of candidate characters derived by said deriving means with each other; and output controlling means for controlling a character recognition output such that, when a result of a comparison made by said comparison means indicates that the plurality of candidate characters are the same, the same candidate character is output and such that, when a result of a comparison made by said comparison means indicates that the plurality of candidate characters are not the same, an error message is issued.

2. A character recognition method comprising the steps of:

deriving a plurality of candidate characters and corresponding operation results from first and second dictionary means, wherein the first dictionary means is different from the second dictionary means in that the first dictionary means stores character patterns used frequently and the second dictionary means stores character patterns used less frequently, and wherein the operation result is indicative of a similarity between an input character pattern stored in said first and second dictionary means and an input character;

comparing each of the operation results derived in said deriving step with a predetermined reference standard;

judging, in the case where all of the operation results do not satisfy the predetermined reference standard, whether or not a plurality of derived candidate characters are the same;

outputting the same derived candidate character in the case where it is judged that a plurality of candidate characters are the same; and issuing an error message in the case where it is judged a plurality of candidate characters are not the same.

3. A character recognition apparatus comprising:

input means for inputting a character pattern;

at least first and second dictionary means each for storing a plurality of character patterns, the first dictionary means being different from the second dictionary means in that said first dictionary means stores character patterns used frequently and said second dictionary means stores character patterns used less frequently;

first deriving means for deriving a first candidate character and an operation result thereof from said first dictionary means, wherein the operation result is indicative of a similarity between a character pattern stored in said first dictionary means and a character pattern input by said input means;

first judging means for judging whether or not the operation result derived by said first deriving means satisfies a predetermined reference standard;

second deriving means for deriving a second candidate character and an operation result thereof from said second dictionary means, wherein the operation result is indicative of a similarity between a character pattern stored in said second dictionary means and a character pattern input by said input means;

second judging means for judging whether or not the operation result derived by said second deriving means satisfies a predetermined reference standard;

comparison means for comparing the first and second candidate characters with each other if said first and second judging means judge that the operation results do not satisfy the respective predetermined reference standards; and output means for outputting the candidate character judged as the same by a result of a comparison made by said comparison means.

4. A character recognition apparatus comprising:

at least first and second dictionary means each for storing a plurality of character patterns, the first dictionary means being different from the second dictionary means in that said first dictionary means stores character patterns used frequently and said second dictionary means stores character patterns used less frequently;

deriving means for deriving a plurality of candidate characters recognized with said first and second dictionary means;

judging means for judging whether the plurality of candidate characters satisfies a predetermined reference standard;

comparison means for comparing the plurality of candidate characters with each other; and output controlling means for controlling such that, when a result of a comparison made by said comparison means indicates that the plurality of candidate characters are the same, the same candidate character is output and such that, when a result of a comparison made by said comparison means indicates that the plurality of candidate characters are not the same, one of the plurality of candidate characters which is closest to the predetermined reference standard is output.

5. A character recognition method comprising the steps of:

inputting a character pattern;

storing a plurality of character patterns in each of at least first and second dictionaries, the first dictionary being different from the second dictionary in that the first dictionary stores character patterns used frequently and the second dictionary stores character patterns used less frequently;

deriving a first candidate character and an operation result thereof from the first dictionary, wherein the operation result is indicative of a similarity between a character pattern stored in the first dictionary and a character pattern input by said input step;

a first judging step of judging whether or not the operation result derived by said deriving step satisfies a predetermined reference standard;

deriving a second candidate character and an operation result thereof from the second dictionary, wherein the operation result is indicative of a similarity between a character pattern stored in the second dictionary and a character pattern input by said input step;

a second judging step of judging whether or not the operation result derived by said second deriving step satisfies a predetermined reference standard;

comparing whether the first and second candidate characters are the same if said first and second judging steps judge that the operation results do not satisfy the respective predetermined reference standards; and outputting the candidate character judged as the same by a result of a comparison made by said comparing step.

6. In a character recognition apparatus for storing a plurality of character patterns in a plurality of dictionaries, a character recognition method comprising the steps of:

providing at least first and second dictionaries each for storing a plurality of character patterns, the first dictionary being different from the second dictionary in that said first dictionary stores character patterns used frequently and said second dictionary stores character patterns used less frequently;

deriving a plurality of candidate characters recognized with said first and second dictionaries;

judging whether the plurality of candidate characters satisfies a predetermined reference standard;

comparing the plurality of candidate characters with each other; and controlling such that, when a result of a comparison made by said comparison step indicates that the plurality of candidate characters are the same, the same candidate character is output and such that, when a result of a comparison made by said comparison step indicates that the plurality of candidate characters are not the same, one of the plurality of candidate characters which is closest to the predetermined reference standard is output.

7. A computer-readable memory medium storing computer-executable process steps to perform character recognition, the process steps comprising:

a deriving step to derive a plurality of candidate characters and corresponding operation results from first and second dictionary means, wherein the first dictionary means is different from the second dictionary means in that the first dictionary means stores character patterns used frequently and the second dictionary means stores character patterns used less frequently, and wherein the operation result is indicative of a similarity between an input character pattern stored in said first and second dictionary means and an input character;

a comparing step to compare each of the operation results derived in said deriving step with a predetermined reference standard;

a judging step to judge, in the case where all of the operation results do not satisfy the predetermined reference standard, whether or not a plurality of derived candidate characters are the same;

an outputting step to output the same derived candidate character in the case where it is judged that a plurality of candidate characters are the same; and an issuing step to issue an error message in the case where it is judged a plurality of candidate characters are not the same.

8. A computer-readable memory medium storing computer-executable process steps to perform character recognition, the steps comprising:

an inputting step to input a character pattern;

a storing step to store a plurality of character patterns in each of at least first and second dictionaries, the first dictionary being different from the second dictionary in that the first dictionary stores character patterns used frequently and the second dictionary stores character patterns used less frequently;

a first deriving step to derive a first candidate character and an operation result thereof from the first dictionary, wherein the operation result is indicative of a similarity between a character pattern stored in the first dictionary and a character pattern input in said inputting step;

a first judging step to judge whether or not the operation result derived in said deriving step satisfies a predetermined reference standard;

a second deriving step to derive a second candidate character and an operation result thereof from the second dictionary, wherein the operation result is indicative of a similarity between a character pattern stored in the second dictionary and a character pattern input in said input step;

a second judging step to judge whether or not the operation result derived in said second deriving step satisfies a predetermined reference standard;

a comparing step to compare whether the first and second candidate characters are the same if it is judged in said first and second judging steps that the operation results do not satisfy the respective predetermined reference standards; and an outputting step to output the candidate character judged as the same by a result of a comparison made in said comparing step.

9. For use in a character recognition apparatus storing a plurality of character patterns in a plurality of dictionaries, a computer-readable memory medium storing computer-executable process steps to perform character recognition, the process steps comprising:

a providing step to provide at least first and second dictionaries each for storing a plurality of character patterns, the first dictionary being different from the second dictionary in that said first dictionary stores character patterns used frequently and said second dictionary stores character patterns used less frequently;

a deriving step to derive a plurality of candidate characters recognized with said first and second dictionaries;

a judging step to judge whether the plurality of candidate characters satisfies a predetermined reference standard;

a comparing step to compare the plurality of candidate characters with each other; and a controlling step to control such that, when a result of a comparison made in said comparison step indicates that the plurality of candidate characters are the same, the same candidate character is output and such that, when a result of a comparison made in said comparison step indicates that the plurality of candidate characters are not the same, one of the plurality of candidate characters which is closest to the predetermined reference standard is output.

10. A character recognition apparatus according to claim 1, wherein said first and second dictionary means is detachably provided in said apparatus.

11. A character recognition apparatus according to claim 3, wherein said input means includes cutting means for cutting out a character pattern from character image data, and wherein said first and second deriving means derive a candidate character every time a character is cut out from the character image data.

12. A character recognition apparatus according to claim 1, further comprising input means for cutting out a character pattern from character image data and for inputting the cut-out character pattern to said deriving means, wherein said deriving means derive a candidate character every time a character is cut out from the character image data.

13. A method according to claim 2, wherein said step of deriving a candidate character is repeated until an operation result thereof is judged to satisfy the predetermined reference value.

14. A method according to claim 2, further comprising the step of detachably providing the first and second dictionary means.

15. A method according to claim 2, further comprising cutting out a character pattern from character image data and inputting the cut out character pattern, wherein candidate characters are derived every time a character pattern is cut out from character image data.

16. An apparatus according to claim 3, wherein if said first judging means judges that the operation result satisfies the predetermined reference standard, said output means outputs the first candidate characters.

17. An apparatus according to claim 3, wherein if said second judging means judges that the operation result satisfies the predetermined reference standard, said output means outputs the second candidate character.

18. A method according to claim 5, wherein if said first judging step judges that the operation result satisfies the predetermined reference standard, said output step outputs the first candidate character.

19. A method according to claim 5, wherein if said second judging step judges that the operation result satisfies the predetermined reference standard, said output step outputs the second candidate character.

20. An apparatus according to claim 4, wherein said output controlling means controls the character recognition output such that the same candidate character or the error message is output to a host computer.

21. An apparatus according to claim 1, wherein said output controlling means controls the character recognition output such that the same candidate character or the same candidate character or the error message is output to a display device.

22. An apparatus according to claim 1, wherein said output controlling means controls the character recognition output such that the same candidate character or the error message is output to a printer.

23. An apparatus according to claim 1, wherein said deriving means derives the plurality of candidate characters by performing a character recognition on an input image.

24. An apparatus according to claim 3, wherein said output means outputs the candidate character to a host computer.

25. An apparatus according to claim 3, wherein said output means outputs the candidate character to a display device.

26. An apparatus according to claim 3, wherein said output means outputs the candidate character to a printer.

27. An apparatus according to claim 3, wherein said first and second deriving means derive the first and second candidate characters, respectively, by performing a character recognition on the input character pattern.

28. An apparatus according to claim 4, wherein said output controlling means controls such that the same candidate character or the one of the plurality of candidate characters is output to a host computer.

29. An apparatus according to claim 4, wherein said output controlling means controls such that the same candidate character or the one of the plurality of candidate characters is output to a display device.

30. An apparatus according to claim 4, wherein said output controlling means controls such that the same candidate character or the one of the plurality of candidate characters is output to a printer.

31. An apparatus according to claim 4, wherein said deriving means derives the plurality of candidate characters by performing a character recognition on an input image.

32. A method according to claim 2, wherein the same derived candidate character or the error message is output to a host computer.

33. A method according to claim 2, wherein the same derived candidate character or the error message is output to a display device.

34. A method according to claim 2, wherein the same derived candidate character or the error message is output to a printer.

35. A method according to claim 2, wherein the plurality of candidate characters are derived by performing a character recognition on an input image.

36. A method according to claim 5, wherein the candidate character judged as the same is output to a host computer in said outputting step.

37. A method according to claim 5, wherein the candidate character judged as the same is output to a display device in said outputting step.

38. A method according to claim 5, wherein the candidate character judged as the same is output to a printer in said outputting step.

39. A method according to claim 5, wherein the first and second candidate characters are derived by performing a character recognition on the input character pattern.

40. A method according to claim 6, wherein the same candidate character or the one of the plurality of candidate characters is output to a host computer.

41. A method according to claim 6, wherein the same candidate character or the one of the plurality of candidate characters is output to a display device.

42. A method according to claim 6, wherein the same candidate character or the one of the plurality of candidate characters is output to a printer.

43. A method according to claim 6, wherein the plurality of candidate characters are derived by performing a character recognition on an input image.

44. A computer-readable memory medium storing computer-executable process steps according to claim 7, wherein the same derived candidate character or the error message is output to a host computer.

45. A computer-readable memory medium storing computer-executable process steps according to claim 7, wherein the same derived candidate character or the error message is output to a display device.

46. A computer-readable memory medium storing computer-executable process steps according to claim 7, wherein the same derived candidate character or the error message is output to a printer.

47. A computer-readable memory medium storing computer-executable process steps according to claim 7, wherein the plurality of candidate characters are derived by performing a character recognition on an input image.

48. A computer-readable memory medium storing computer-executable process steps according to claim 8, wherein the candidate character judged as the same is output to a host computer.

49. A computer-readable memory medium storing computer-executable process steps according to claim 8, wherein said the candidate character judged as the same is output to a display.

50. A computer-readable memory medium storing computer-executable process steps according to claim 8, wherein the candidate character judged as the same is output to a printer.

51. A computer-readable memory medium storing computer-executable process steps according to claim 8, wherein the first and second candidate characters are derived by performing a character recognition on the input character pattern.

52. A computer-readable memory medium storing computer-executable process steps according to claim 9, wherein the same candidate character or the one of the plurality of candidate characters is output to a host computer.

53. A computer-readable memory medium storing computer-executable process steps according to claim 9, wherein the same candidate character or the one of the plurality of candidate characters is output to a display device.

54. A computer-readable memory medium storing computer-executable process steps according to claim 9, wherein the same candidate character or the one of the plurality of candidate characters is output to a printer.

55. A computer-readable memory medium storing computer-executable process steps according to claim 9, wherein the plurality of candidate characters are derived by performing a character recognition on an input image.

* * * * *

UNITED STATES PATENT AND TRADEMARK OFFICE
CERTIFICATE OF CORRECTION

PATENT NO. : 5,787,202
DATED : July 28, 1998
INVENTOR(S) : Shugoro Ueno

It is certified that error appears in the above-identified patent and that said Letters Patent is hereby corrected as shown below:

COLUMN 4

Line 40, "what" should read --What--.

COLUMN 9

Line 5, "4," should read --1,--.

COLUMN 10

Line 38, "said" should be deleted.

Signed and Sealed this

Twenty-third Day of February, 1999

Attest:

Q. TODD DICKINSON

*Attesting Officer*   *Acting Commissioner of Patents and Trademarks*